United States Patent [19]

Bernier et al.

[11] Patent Number: 5,051,456

[45] Date of Patent: Sep. 24, 1991

[54] PROCESS FOR REMOVING DIENES FROM ETHYLENE PROPYLENE DIENE MONOMER RESINS

[75] Inventors: Robert J. N. Bernier, Flemington, N.J.; David N. Edwards, Charleston; Richard W. Wegman, So. Charleston, both of W. Va.

[73] Assignee: Union Carbide Chemicals and Plastics Technology Corporation, Danbury, Conn.

[21] Appl. No.: 501,780

[22] Filed: Mar. 30, 1990

[51] Int. Cl.$^5$ ............................ C08J 3/28; C08K 3/04
[52] U.S. Cl. .................... 523/300; 528/502; 528/501; 528/483; 528/481; 252/511
[58] Field of Search ............... 523/300; 528/502, 501, 528/483, 481; 252/511

[56] References Cited

U.S. PATENT DOCUMENTS

| | | | |
|---|---|---|---|
| 3,434,220 | 3/1969 | Forster et al. | 34/1 |
| 3,977,089 | 8/1976 | Forster et al. | 34/1 |
| 4,055,001 | 10/1977 | Forster et al. | 34/1 |
| 4,104,205 | 8/1978 | Novotny et al. | 260/2.3 |

FOREIGN PATENT DOCUMENTS

T41425  8/1979  Hungary .

Primary Examiner—Paul R. Michl
Assistant Examiner—John J. Guarriello
Attorney, Agent, or Firm—Clement J. Vicari

[57] ABSTRACT

A process for removing diene from ethylene propylene diene monomer resin by subjecting said resin containing diene monomer to microwave energy in an amount for a time sufficient to evolve diene vapors while simultaneously passing a gas through said resin to removing said evolved diene vapors.

11 Claims, 1 Drawing Sheet

PROCESS FOR REMOVING DIENES FROM ETHYLENE PROPYLENE DIENE MONOMER RESINS

BACKGROUND OF THE INVENTION

1. Field of the Invention

The present invention relates to a process for removing diene from ethylene propylene diene monomer (EPDM) resins and more particularly to a process for reducing ethylidene norbornene present in such resins.

2. Description of the Prior Art

The introduction of high activity Ziegler-Natta catalyst systems has lead to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefin polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions. More recently, the gas phase fluid bed reactor has been extended to the production of rubbery resins such as ethylene propylene diene monomer such as disclosed in U.S. Pat. No. 4,710,538 issued Dec. 1, 1987.

Ethylene propylene diene monomer (EPDM) resins are presently produced by a variety of techniques. In certain processes for producing EPDM resins, wherein the diene is ethylidene norbornene, the amount of ethylidene norbornene monomer, remaining in the finished polymer, (i.e., after completion of the devolatilization process to remove dissolved monomer from the polymer,) in a free form is such as to cause objectionable odors.

Thus when producing and recovering EPDM resin according to certain of the above processes, there still exists a somewhat objectionable odor in the resins product. This is primarily due to the fact that ethylidene norbornene (ENB) a monomer used to produce sulfur curable ethylene-propylene rubbers has a very distinctive and objectionable odor and is present in minute quantities in the finished product. Ethylidene norbornene can be detected by humans at concentrations as low as 14 ppbv. For example, in a typical fluidized bed process EPDM resins contain as much as 15% by weight of the dissolved ENB.

Current techniques for reducing the amount of ENB present in EPDM resins produced by a gas fluidized bed process involves counter current purging of the settled resin with nitrogen whereby the recovered ENB is recycled to the reactor. Unfortunately however with this technique, resin sintering occurs and excessive nitrogen usage is required.

More recently, U.S. Pat. No. 4,910,295 issued Mar. 20, 1990 and assigned to a common assignee discloses a process for reducing the amount of ENB present in EPDM resin wherein a crystalline siliceous molecular sieve is introduced into the EPDM resin in an amount sufficient to reduce the odor produced by ENB present in said EPDM resin.

The present invention is based on the discovery that the amount of diene e.g., ethylidene norbornene present in EPDM resin can be substantially reduced by subjecting the resin to microwave energy in the presence of a dielectric material for a time and in an amount sufficient to evolve ENB vapors from the EPDM resin without causing any physical or chemical changes in the EPDM resin, while simultaneously subjecting the EPDM resin to an inert gas, such as nitrogen, to remove vaporized ENB from the resin and to prevent sintering of the resin.

SUMMARY OF THE INVENTION

Broadly contemplated therefore the present invention provides a process for reducing the amount of dienes present in EPDM resins, which comprises:

(1) incorporating onto or admixing with said EPDM resin a dielectric material capable of absorbing electromagnetic energy and conducting heat to said EPDM resin;

(2) subjecting said EPDM resin containing said dielectric material to microwave energy in an amount and for a time sufficient to evolve diene vapors from said EPDM resin without causing any physical or chemical change in the EPDM resin; and (3) simultaneously passing a gas through said resin to remove said evolved diene vapors from said resin and to prevent sintering of said resin.

In a more preferred aspect, the diene is an ethylidene norbornene monomer and the gas is an inert gas such as nitrogen.

DETAILED DESCRIPTION

Figure 1:
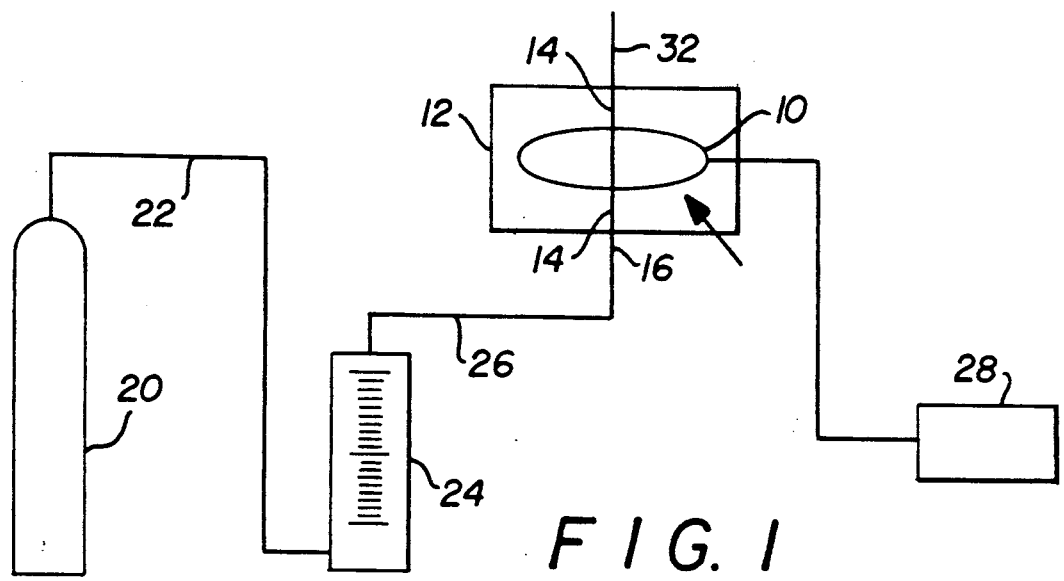
FIG. 1 is a schematic representation of the process of the present invention.

Although the invention can be practiced in connection with any process typically employed to produce EPDM resins containing a free diene e.g., ethylidene norbornene therein, the invention is however preferably applicable in connection with EPDM resins produced by a gas fluidized bed reaction process.

Merely as illustrative, the fluidized bed reactor can be the one described in U.S. Pat. No. 4,482,687 or another conventional reactor for the gas phase production of, for example, polyethylene or ethylene copolymers and terpolymers. The bed is usually made up of the same granular resin that is to be produced in the reactor. Thus, during the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas. A typical cycle gas is comprised of ethylene, nitrogen, hydrogen, and propylene, butene, hexene monomers or dienes, either alone or in combination.

EPDM RESIN

The EPDM resin which can be treated according to the present invention is produced according to conventional procedures either in granular or pelleted form. The present invention is particularly applicable to treating resins produced by the gas fluidized bed process. The EPDM resin can be a terpolymer which includes ethylene, propylene and a diene preferably an ethylidene norbornene monomer. The amount of ethylene, propylene and diene can vary over a wide range, however, the present invention is particularly applicable to resins which have excessive amounts of diene, e.g. ethylidene norbornene i.e., above about 100 parts per million ENB remaining in the terpolymer which causes the offensive odor attributable to the resin.

PURGE GAS

The purge gas which can be employed according to the present invention is any gas which is preferably inert to the resin and which is capable of transporting vaporized ENB away from the resin bed subjected to microwave energy. Although nitrogen is the inert gas of choice, other gases such as argon, helium, methane, and like other hydrocarbons can be employed. It is also contemplated that ethylene and propylene gas which are not inert gases to the reaction can also be employed if desired. The rate of the purge gas can be of any value provided however that it is sufficient to remove the vaporized diene. Gas flow rates having a gas hourly space velocity (GHSV) of about 2000 to 50,000 $hr^{-1}$ are applicable.

DIELECTRIC MATERIAL

These are materials whose properties range from conductors to insulators and which include a class of material known as "lossy dielectrics". It is this group which absorb electromagnetic energy and convert it to heat. Examples of suitable dielectric materials include carbon, water, oils, wood and food materials containing moisture. The dielectric materials which can be employed in the present invention include carbon, the preferred dielectric material or any lossy dielectric existing in a powdered form.

The dielectric material can be incorporated into the resin preferably during polymerization, or alternatively, the dielectric material can be admixed with the resin prior to subjecting the resin to microwave energy. The amount of dielectric material utilized depends on the type of resin being treated as well as the type of dielectric material employed. In general, the amount utilized should be such as to permit thermal conduction through the polymer particle to cause rapid volatilization of the dissolved diene e.g, ENB.

The dielectric material of choice is carbon black. Advantageously, carbon black can be added to the reactor during polymerization resulting in a polymer which has the carbon black incorporated into the polymer. Carbon black can be employed in amounts of about 1 to 50% preferably about 15% to 25% based on the weight of the resin.

OPERATING EQUIPMENT

The reaction system generally includes a microwave generator which is coupled to a resonance cavity. The microwave generator can be conventional in the art. Merely as illustrative, the microwave generator is commercially available from Opthos Instruments (Model/MPG4). This type generator normally has an output of 0 to about 120 watts at about 2.45 $GH_z$.

The reasonance cavity can be fabricated from a material which reflects electromagnetic waves. Suitable material include aluminum and steel. The reasonance cavity is contained within a conventional faraday cage which is designed to trap any electromagnetic energy which may leak from the reasonance cavity. Normally the faraday cage is a copper frame covered with bronze mesh wire.

Positioned inside and extending through the resonance cavity is a reaction tube which is fabricated from a material which permits microwave energy to pass through it to the resin bed contained within the reaction tube. Attached to the front end of the reaction tube (outside of the resonance cavity) is a gas inlet system for purging the resin bed. With this arrangement, the microwave energy is introduced into the resonance cavity and the energy is transferred to the resin bed and activates it. The EPDM resin bed can be irradiated continuously or intermittently (i.e., the microwave field can be pulsed).

An important criteria is that the microwave energy source is coupled to the resin bed. This is accomplished by creating a standing wave and positioning the resin bed in the standing wave. It will of course be understood that the resin bed can be directly irradiated by other techniques such as by positioning the resin bed in an "unfocused" or multi-mode microwave energy field.

OPERATING CONDITIONS

The microwave input power generally depends on reactor design, the amount and type of resin treated and other variables. In general, enough microwave energy must be supplied to carry out the desired reaction. The EPDM resin can be irradiated continuously or in a pulse mode. In the first case, the total irradiation time will vary widely and will be a function of the reactor configuration and the amount of EPDM resin present. In the pulse mode, a cycle which permits irradiation (on) followed by no irradiation (off) can be repeated for various on/off times and for various total irradiation times (total time). The important criteria is that the resin which has the dielectric material either incorporated in or admixed with the resin is subjected to microwave energy while simultaneously passing a gas through the resin, the microwave energy being supplied in an amount and for a time sufficient to remove the diene without causing any physical or chemical change in the resin and to prevent sintering of the resin. The amount of time can generally range from about 0.5 to about 5 minutes and the amount of microwave energy can range from about 1 kw to about 60 kw.

The pressures utilized can be any convenient pressure and depends on reactor design. In general, pressures in the range of about 1 atm. to about 200 atm can be employed.

Figure 2:
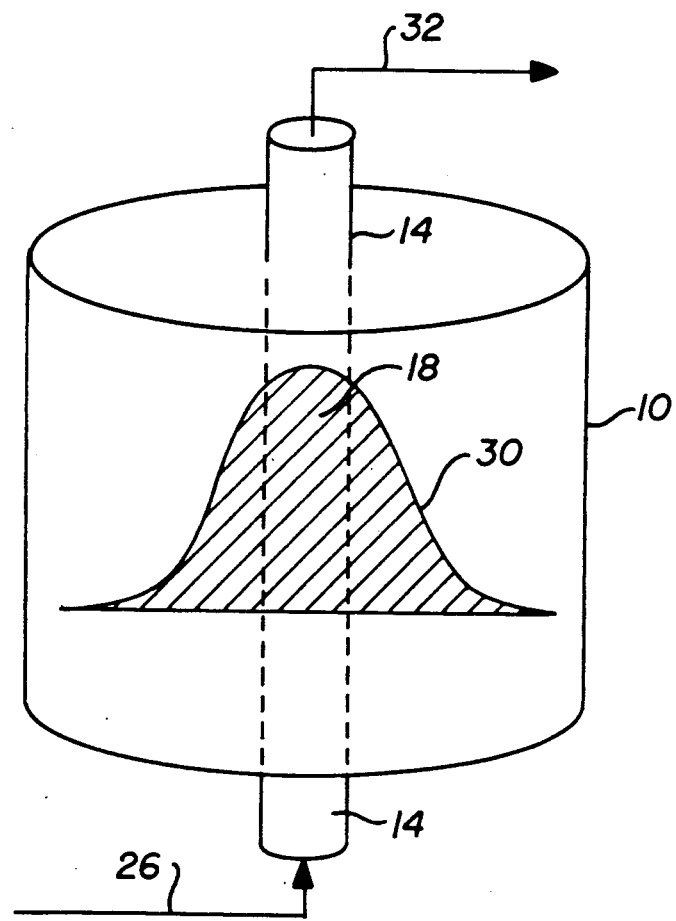
FIG. 2 is a representation of a single mode resonance cavity which can be employed in the invention showing a microwave generator coupled to the resonance cavity and which illustrates a reactor tube extending through the cavity along the axis of a standing wave.

FIG. 1 illustrates one technique for carrying out the process of the invention. Referring to FIG. 1, there is illustrated a resonance cavity 10 which is contained within a faraday cage 12. As shown in FIG. 2, reaction tube 14 extends longitudinally through reasonance cavity 10. Attached to one end 16 of reaction tube 14 is a gas inlet system for purging the resin bed 18. With reference to FIG. 1, the gas inlet system includes a gas vessel such as a nitrogen vessel 20 which supplies nitrogen under pressure to the end 16 of tube 14. Thus nitrogen gas which leaves vessel 20 through line 22 passes through gas flow meter 24, thence through line 26 into end 16 of tube 14. Suitable valves and vents are provided (not shown) between nitrogen vessel 20 and reaction tube 16 to regulate the flow and pressure of the gas.

Coupled to resonance cavity 10 is a microwave generator 28 which supplies microwave energy to resonance cavity 10 to form a standing wave 30 as shown in FIG. 2. Gas which passes through resin bed 18 leaves reactor tube 14 through line 32 for analyzing diene content.

In a typical mode of operation EPDM resin is loaded into reaction tube 14, which is packed with a quartz wool plug which supports the resin.

The tube is also packed about half way with quartz chips. A quartz wool plug is placed into reactor tube 14 over the resin bed 18. The tube is thereafter inserted into position in resonance cavity 10 and nitrogen from nitrogen vessel 20 is then directed through line 22 through gas flow meter 24 and into end 16 of tube 14. Readings are taken until the desired purge flow rates are established. Reactor tube 14 is thereafter irradiated with microwave energy from microwave generator 28 at the desired input power for a time of about 0.5 to 5.0 minutes. The system is then deactivated and the resin is thereafter removed and analyzed.

The following Examples will further illustrate the present invention.

In the Examples the following procedures were utilized: a small quartz wool plug was placed at the bottom of a quartz reaction tube. The tube was packed approximately one half with full quartz chips. One half to 3.5 mL of EPDM resin was loaded into the quartz tube followed by a small quartz wool plug and then quartz chips and another quartz wool plug near the opposite end of the tube. The reaction tube was placed inside the microwave resonance cavity and connected to the purge gas inlet and outlet lines. The desired purge gas flow rate was established. The reactor tube was then irradiated with microwave at 2.45 GHz and the desired input power (watts). After the desired irradiation time the microwave power was shut off and the reaction tube was retrieved. The irradiated EPDM resin was removed and placed in a sealed sample vial. The resin was analyzed for residual ENB using GPC headspace.

EXAMPLE 1

In this example the EPDM resin was produced by a gas fluidized bed process and included 45 wt % $C_2$, 40 wt % $C_3$, 5 wt % ENB and 10 wt % carbon admixed with the resin. The resin contained 25,200 ppm residual ENB. Two mL of the resin was charged to the resonance cavity according to the procedures described above. The $N_2$ purge gas flow was set to 700 cc/min (GHSV=21000 $hr^{-1}$) and the sample was irradiated with 100 watts for 5 minutes (continuously). The recovered resin was analyzed and found to contain 0 ppm of residual ENB. There was no sintering of the resin and no physical or chemical change was evident.

EXAMPLES 2-18

The reaction was carried out similarly to Example 1 except that the input power, purge gas flow rate and irradiation times were varied. The results are listed in Table 1 below:

TABLE 1

| Example # | $N_2$ Flow mL/min | Input Power watts | Time min | ENB* ppm |
|---|---|---|---|---|
| 2 | 1400 | 100 | 1.0 | 3500 |
| 3 | 1400 | 100 | 0.5 | 7400 |
| 4 | 700 | 100 | 0.5 | 4800 |
| 5 | 1000 | 75 | 3.0 | 640 |
| 6 | 1000 | 75 | 1.0 | 3900 |
| 7 | 1000 | 75 | 0.5 | 9800 |
| 8 | 700 | 75 | 3.0 | 410 |
| 9 | 700 | 75 | 1.0 | 3300 |
| 10 | 1400 | 50 | 1.0 | 8200 |
| 11 | 700 | 50 | 2.0 | 3300 |
| 12 | 700 | 50 | 1.0 | 4900 |
| 13 | 350 | 50 | 2.0 | 4200 |
| 14 | 350 | 50 | 1.0 | 7500 |
| 15 | 700 | 25 | 3.0 | 4400 |
| 16 | 350 | 25 | 6.0 | 3330 |
| 17 | 350 | 25 | 3.0 | 4400 |
| 18 | 100 | 25 | 3.0 | 9700 |

*ENB ppm is the residual ENB still dissolved in the polymer after irradiating with microwave. These results demonstrate that at high input power a reduction in nitrogen flow results in an enhancement of ENB removal. No physical or chemical changes were evident.

COMPARATIVE EXAMPLES 1-4

The reaction was carried out similarly to Example 1 except that the resin was not irradiated with microwave. The results are given in Table 2.

TABLE 2

| Comparative Example # | $N_2$ Flow mL/min | Input Power watts | Time min | ENB* ppm |
|---|---|---|---|---|
| 1 | 1400 | 0 | 3.0 | 17100 |
| 2 | 1400 | 0 | 1.0 | 21800 |
| 3 | 700 | 0 | 3.0 | 20000 |
| 4 | 700 | 0 | 1.0 | 22700 |

The results demonstrate that in the absence of microwave irradiation only a small amount of ENB is removed by the purge gas.

EXAMPLES 19-22

In this series of examples the EPDM resin was produced by the gas fluidized bed process and included 28 wt % $C_3$, 70.7 wt % $C_2$, 1 wt % ENB, and 0.3 wt % carbon. The resin contained 4200 ppm residual ENB. The reaction was carried out as described in Example 1. The results are reported in Table 3.

TABLE 3

| Example # | $N_2$ Flow mL/min | Input Power watts | Time min | ENB* ppm |
|---|---|---|---|---|
| 19 | 700 | 100 | 2.0 | 1260 |
| 20 | 350 | 100 | 3.0 | 1090 |
| 21 | 350 | 100 | 6.0 | 680 |
| 22 | 250 | 100 | 6.0 | 540 |

These results demonstrate that ENB is removed by microwave from an EPDM resin of different composition. No physical or chemical changes were evident.

EXAMPLE 23

The resin used in this example had the same composition as the resin utilized in Example 1. The resin contained 22,800 ppm residual ENB. The reaction was carried out similarly to Example 1 except that the resin was pulsed with microwave instead of continuously irradiated. The $N_2$ flow rate was 700 mL/min and the microwave input power was 100 watts. The resin was irradiated for 30 seconds followed by 30 seconds of no irradiation. This cycle was repeated until the sample was irradiated for a total of 3 minutes. The recovered resin was analyzed and found to contain 0 ppm of residual ENB. No physical or chemical changes were evident.

EXAMPLE 24

The reaction was carried out similarly to Example 23 except that the pulse cycle, total irradiation time, input power, and N2 purge rates were varied. The results are given in Table 4.

TABLE 4

| Example # | N$_2$ Flow mL/min | Input watts | Cycle Time[1] on | Cycle Time[1] off | Total Time min | ENB* ppm |
|---|---|---|---|---|---|---|
| 24 | 700 | 100 | 20 | 30 | 3.0 | 0 |
| 25 | 700 | 75 | 30 | 30 | 3.0 | 130 |
| 26 | 350 | 75 | 30 | 30 | 3.0 | 0 |
| 27 | 700 | 100 | 30 | 30 | 1.5 | 360 |
| 28 | 700 | 75 | 20 | 30 | 3.0 | 540 |
| 29 | 350 | 75 | 20 | 30 | 3.0 | 5 |
| 30 | 350 | 100 | 20 | 30 | 1.5 | 0 |

[1]Cycle time in seconds

These results demonstrate that pulsing the microwave radiation in efficient removal of ENB from the EPDM resin. No physical or chemical changes were evident.

What is claimed is:

1. A process for reducing the amount of dienes present in EPDM resins, which comprises:
   (1) incorporating onto or admixing with said EPDM resin a dielectric material capable of absorbing electromagnetic energy and conducting heat to said EPDM resin;
   (2) subjecting said EPDM resin containing said dielectric material to microwave energy in an amount and for a time sufficient to evolve diene vapors from said EPDM resin without causing any physical or chemical change in the EPDM resin; and
   (3) simultaneously passing a gas through said resin to remove said evolved diene vapors from said resin and to prevent sintering of said resin.

2. A process according to claim 1 wherein said diene is ethylidene norbornene.

3. A process according to claims 1 or 2 wherein said dielectric material is carbon black.

4. A process according to claim 3 wherein said carbon black is present in said resin in an amount of about 1% to 50% based on the weight of the resin.

5. A process according to claim 3 wherein said carbon black is present in said resin in an amount of about 15% to about 25%.

6. A process according to claim 1 wherein said gas is an inert gas.

7. A process according to claim 1 wherein said gas is ethylene.

8. A process according to claim 1 wherein said gas is propylene.

9. A process according to claim 6 wherein said gas is nitrogen.

10. A process according to claim 1 wherein said microwave energy is in an amount of about 1 kw to about 60 kw.

11. A process according to claim 1 wherein said resin is subjected to microwave energy for a time of about 0.5 to 5 mins.

* * * * *